US010853960B2

(12) United States Patent
Lee et al.

(10) Patent No.: US 10,853,960 B2
(45) Date of Patent: Dec. 1, 2020

(54) STEREO MATCHING METHOD AND APPARATUS

(71) Applicants: Samsung Electronics Co., Ltd., Suwon-si (KR); Gwangju Institute of Science and Technology, Gwangju (KR)

(72) Inventors: Kee Chang Lee, Seongnam-si (KR); Wonhee Lee, Yongin-si (KR); Kuk-Jin Yoon, Gwangju (KR); Yongho Shin, Seoul (KR); Yeong Won Kim, Wonju-si (KR); Jin Ho Song, Daejeon (KR)

(73) Assignees: Samsung Electronics Co., Ltd., Suwon (KR); Gwangju Institute of Science and Technololgy, Gwangju (KR)

( * ) Notice: Subject to any disclaimer, the term of this patent is extended or adjusted under 35 U.S.C. 154(b) by 301 days.

(21) Appl. No.: 15/869,419

(22) Filed: Jan. 12, 2018

(65) Prior Publication Data
US 2019/0080464 A1 Mar. 14, 2019

(30) Foreign Application Priority Data
Sep. 14, 2017 (KR) ........................ 10-2017-0117922

(51) Int. Cl.
| G06T 7/593 | (2017.01) |
| G06T 7/246 | (2017.01) |
| H04N 13/271 | (2018.01) |
| H04N 13/239 | (2018.01) |
| G06T 7/33 | (2017.01) |
| H04N 13/00 | (2018.01) |

(52) U.S. Cl.
CPC .............. *G06T 7/593* (2017.01); *G06T 7/246* (2017.01); *G06T 7/33* (2017.01); *H04N 13/239* (2018.05); *H04N 13/271* (2018.05); *G06T 2207/10012* (2013.01); *G06T 2207/10028* (2013.01); *G06T 2207/20228* (2013.01); *H04N 2013/0081* (2013.01)

(58) Field of Classification Search
CPC .......... G06T 7/593; G06T 7/33; G06T 7/246; G06T 2207/10012; G06T 2207/20228; G06T 2207/10028; H04N 13/239; H04N 13/271; H04N 2013/0081
See application file for complete search history.

(56) References Cited

U.S. PATENT DOCUMENTS 9,552,514 B2  1/2017  Zhao et al.
9,578,312 B2  2/2017  Chen et al.
(Continued)

FOREIGN PATENT DOCUMENTS

JP  2015-121524 A  7/2015
KR  10-0415313 B1  1/2004
(Continued)

*Primary Examiner* — Mekonen T Bekele
(74) *Attorney, Agent, or Firm* — NSIP Law

(57) ABSTRACT

Provided is a stereo matching method and apparatus. A stereo matching apparatus may generate a disparity map by transforming a disparity map of a previous frame based on determined motion information of a camera between the previous frame and the current frame, calculate a confidence for the generated disparity map, and adjust a disparity map corresponding to the current frame based on the confidence and the generated disparity map.

22 Claims, 11 Drawing Sheets

(56) References Cited

U.S. PATENT DOCUMENTS

| | | | | |
|---|---|---|---|---|
| 2007/0296721 | A1* | 12/2007 | Chang | H04N 13/359 345/427 |
| 2011/0050853 | A1* | 3/2011 | Zhang | H04N 13/261 348/44 |
| 2011/0298898 | A1* | 12/2011 | Jung | H04N 13/271 348/47 |
| 2012/0257815 | A1* | 10/2012 | Schlosser | H04N 13/15 382/154 |
| 2013/0010073 | A1* | 1/2013 | Do | H04N 13/218 348/46 |
| 2013/0136339 | A1* | 5/2013 | Moon | G06K 9/62 382/154 |
| 2013/0162629 | A1* | 6/2013 | Huang | H04N 13/261 345/419 |
| 2013/0162768 | A1* | 6/2013 | Lie | G06T 7/579 348/43 |
| 2014/0063188 | A1* | 3/2014 | Smirnov | G06T 7/593 348/43 |
| 2014/0153784 | A1* | 6/2014 | Gandolph | G06T 7/215 382/107 |
| 2014/0270485 | A1* | 9/2014 | Kauff | G06T 5/002 382/154 |
| 2015/0093017 | A1* | 4/2015 | Hefeeda | G06F 16/7847 382/154 |
| 2016/0019437 | A1* | 1/2016 | Choi | G06T 7/593 382/218 |
| 2016/0063719 | A1* | 3/2016 | Ukil | G06T 7/97 382/103 |
| 2017/0019655 | A1* | 1/2017 | Mueller | H04N 13/128 |
| 2017/0359561 | A1* | 12/2017 | Vallespi-Gonzalez | H04N 13/128 |
| 2018/0218511 | A1* | 8/2018 | Chan | G06T 7/579 |
| 2018/0249072 | A1* | 8/2018 | Li | H04N 5/232127 |

FOREIGN PATENT DOCUMENTS

| | | |
|---|---|---|
| KR | 10-1337423 B1 | 12/2013 |
| KR | 10-1710003 B1 | 2/2017 |

\* cited by examiner

Disparity map of frame T-1

Disparity map transformed from frame T-1 to frame T

Left viewpoint　　　　　Right viewpoint

Left viewpoint　　　　　Right viewpoint

Reference image of frame T

Reference image transformed from frame T-1 to frame T

Static region mask

Initial disparity map

Post-processed disparity map

STEREO MATCHING METHOD AND APPARATUS

CROSS-REFERENCE TO RELATED APPLICATIONS

This application claims the benefit under 35 USC § 119(a) of Korean Patent Application No. 10-2017-0117922 filed on Sep. 14, 2017 in the Korean Intellectual Property Office, the entire disclosure of which is incorporated herein by reference for all purposes.

BACKGROUND

1. Field

The following description relates to a stereo matching technology.

2. Description of Related Art

Stereo matching may refer to technology that includes capturing a left image and a right image using two cameras or image sensors and measuring a distance to a subject or object based on a disparity between the left image and the right image. The two cameras may be separate from each other by a fixed baseline, for example, whereby the left image and the right image may be captured from or at different viewpoints. The disparity occurs due to the different viewpoints and a distance to a target may be derived from the disparity using triangulation, for example. Accordingly, a disparity calculation may directly affect the accuracy of the distance calculation, which may thereby affect further technological processes and provided user interactions of a computing device that is configured to implement the disparity calculation and/or distance calculation based on the determined disparity.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented stereo matching method includes generating a disparity map by transforming a disparity map of a previous frame based on determined motion information of a camera between the previous frame and a current frame, calculating a confidence for the generated disparity map, and adjusting a disparity map corresponding to the current frame based on the calculated confidence and the generated disparity map.

The calculating of the confidence for the generated disparity map may include calculating a confidence of the determined motion information of the camera.

The calculating of the confidence for the generated disparity map may include calculating a confidence of the determined motion information of the camera based on a number of extracted feature points used to estimate the motion information of the camera.

The calculating of the confidence for the generated disparity map may include calculating a confidence of the disparity map of the previous frame.

The calculating of the confidence of the disparity map of the previous frame may include calculating the confidence of the disparity map of the previous frame by comparing a left disparity map and a right disparity map of the previous frame.

The calculating of the confidence for the generated disparity map may include calculating a confidence based on whether a dynamic object is changed between the previous frame and the current frame.

The confidence based on whether the dynamic object is changed between the previous frame and the current frame may be calculated by moving the previous frame using the transformed disparity map and comparing a result of the moving with the current frame.

The adjusting of the disparity map may include adjusting a cost volume corresponding to the current frame based on the calculated confidence, and adjusting the disparity map corresponding to the current frame by performing a cost aggregation with respect to the current frame based on the adjusted cost volume.

The adjusting of the cost volume may include adjusting the cost volume corresponding to the current frame based on the calculated confidence, the generated disparity map, and the disparity map corresponding to the current frame.

The adjusting of the disparity map may include adjusting the disparity map corresponding to the current frame by aggregating costs corresponding to each pixel of the current frame based on a block unit, using the adjusted cost volume.

The method may further include determining a distance to an object in an image for the current frame using the adjusted disparity map corresponding to the current frame.

In one general aspect, provided is a non-transitory computer-readable storage medium storing instructions that, when executed by one or more processors, cause the one or more processors to perform any one, combination, or all operations or methods described herein.

In one general aspect, a stereo matching apparatus includes one or more processors configured to generate a disparity map by transforming a disparity map of a previous frame based on determined motion information of a camera between the previous frame and a current frame, calculate a confidence for the generated disparity map, and adjust a disparity map corresponding to the current frame based on the calculated confidence and the generated disparity map.

The apparatus may further include at least one memory configured to store instructions that, when executed by the one or more processors, cause the one or more processors to perform the generating of the disparity map by performing the transforming of the disparity map of the previous frame, perform the calculating of the confidence for the generated disparity map, and perform the adjusting of the disparity map corresponding to the current frame.

To perform the calculating of the confidence for the generated disparity map, the one or more processors may be configured to calculate a confidence of the determined motion information of the camera.

To perform the calculating of the confidence for the generated disparity map, the one or more processors may be configured to calculate a confidence of the disparity map of the previous frame.

To perform the calculating of the confidence for the generated disparity map, the one or more processors may be configured to calculate a confidence based on whether a dynamic object is changed between the previous frame and the current frame.

The one or more processors may be configured to adjust a cost volume corresponding to the current frame based on the calculated confidence, and adjust the disparity map corresponding to the current frame by performing a cost aggregation with respect to the current frame based on the adjusted cost volume.

In one general aspect, a processor implemented stereo matching method includes generating a cost volume corresponding to a current frame of a stereo camera, calculating a confidence with respect to disparities corresponding to a previous frame of the stereo camera, generating a disparity mapping corresponding to the current frame by performing a cost aggregation with respect to the current frame dependent on the generated cost volume and the calculated confidence, and determining a distance to an object in an image for the current frame using the generated disparity mapping corresponding to the current frame.

The calculating of the confidence with respect to the disparities corresponding to the previous frame further may include calculating the confidence with respect to the disparities corresponding to the previous frame based on consideration of any one or any two or more of respective confidences calculated with respect to a disparity mapping corresponding to the previous frame, determined motion information of the stereo camera, and a determination of whether one or more dynamic objects change between the previous frame and the current frame.

The method may further include determining the motion information of the stereo camera, where the calculating of the confidence with respect to the disparities corresponding to the previous frame may include calculating the confidence with respect to the disparities corresponding to the previous frame based on consideration of at least the determined motion information and/or a transformation of the disparity mapping corresponding to the previous frame based on the determined motion information.

The method may further include performing the transformation of the disparity mapping corresponding to the previous frame based on the determined motion information.

The performing of the cost aggregation with respect to the current frame dependent on the generated cost volume and the calculated confidence may include adjusting the cost volume based on the calculated confidence and the transformed disparity mapping and performing a cost aggregation of the adjusted cost volume.

The performing of the cost aggregation with respect to the current frame dependent on the generated cost volume and the calculated confidence may include adjusting the cost volume based on the calculated confidence and performing a cost aggregation of the adjusted cost volume.

Other features and aspects will be apparent from the following detailed description, the drawings, and the claims.

Figure 1:
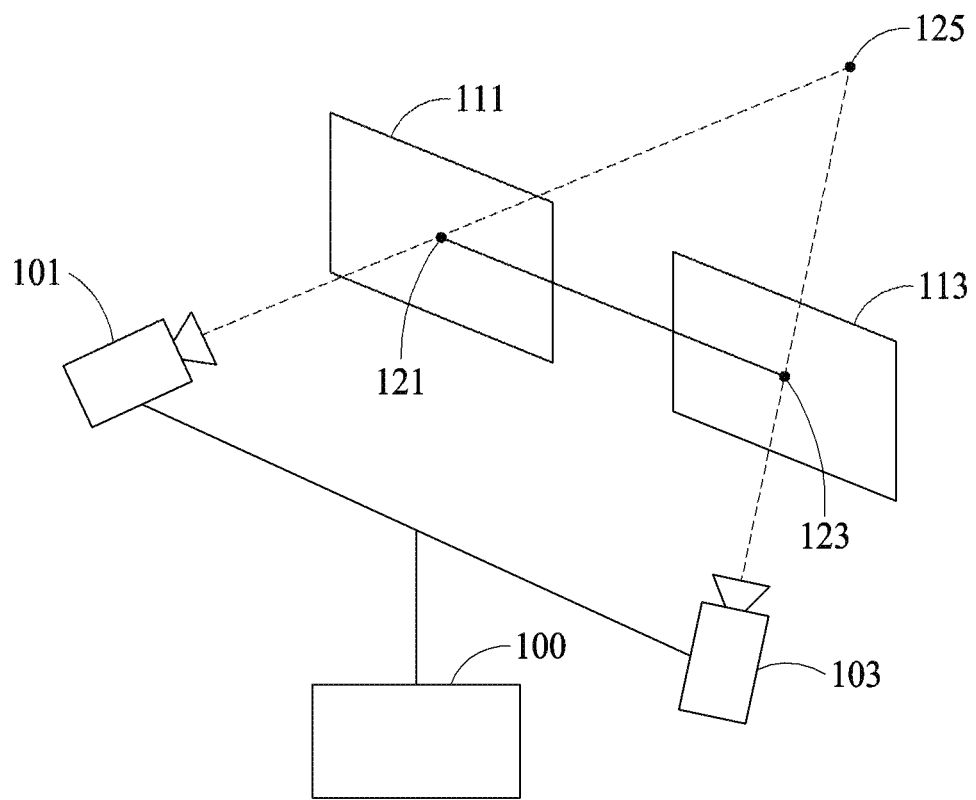
FIG. 1 illustrates an example of a configuration of a stereo matching system.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or likewise, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises/includes" and/or "comprising/including," when used in this specification, specify the presence of stated features, integers, operations, elements, components or a combination thereof, but do not preclude the presence or addition of one or more other features, integers, operations, elements, components, and/or combinations or groups thereof in alternate embodiments. In addition, further alternative embodiments that lack such stated features, integers, operations, elements, components, and/or combinations or groups thereof exist unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined herein, all terms used herein including technical or scientific terms have the same meanings as those generally understood by one of ordinary skill in the art after an understanding of the present disclosure. Terms defined in dictionaries generally used should be construed to have meanings matching with contextual meanings in the related art and the present disclosure and are not to be construed as an ideal or excessively formal meaning unless otherwise defined herein.

If an example is capable of being differently implemented, a function or an operation specified in a specific block may be performed differently from a flowchart. For example, consecutive two blocks may be substantially simultaneously performed and/or order of the blocks may be changed and thereby performed based on a related function or operation.

FIG. 1 illustrates an example of a configuration of a stereo matching system.

In one example, a stereo matching apparatus 100 acquires distance information from a current frame using a previous frame. When using the previous frame, the stereo matching apparatus 100 may determine a confidence of information derived from the previous frame and may thereby prevent, minimize, or reduce inaccurate information from being applied to the distance information of the current frame. The stereo matching apparatus 100 determines the confidence of the information derived from the previous frame and may acquire further distance information of the current frame, e.g., distance information of the current frame that may be more accurate than if distance information of the current frame were based on information obtained with respect to only the current frame.

The stereo matching apparatus 100 may be representative of being, or included in, corresponding computing apparatuses or systems in a variety of fields, for example, a display device, a robot, a vehicle, and included in the example provision of various technological functionalities in three-dimensional (3D) object restoration, and augmented reality, noting that embodiments are not limited thereto and additional computing apparatuses or systems or alternative technological functionalities may be available. For example, the stereo matching apparatus 100 may be representative of, or included in, a 3D display device configured to generate a 3D image from two-dimensional (2D) images captured at different viewpoints. In such an example, the stereo matching apparatus 100 may include or be connected to the example stereo camera, e.g., which includes the camera 101 and camera 103 as non-limiting examples. Accordingly, the stereo matching apparatus 100 may acquire distance information of objects or subjects from such a plurality of cameras and, in a further example, may consider the acquired distance information in further autonomous driving processes of the robot or vehicle example, as non-limiting examples. Thus, the stereo matching apparatus 100 may include a technology of acquiring distance information of an external appearance of an object and three-dimensionally restoring the external appearance of the 3D object using stereo matching.

In an example, the stereo matching apparatus 100 acquires a left image 111 and a right image 113 from the camera 101 and camera 103, respectively. As noted, in an example, the camera 101 and the camera 103 may be included in a stereo camera device, or they may be separate camera devices. Herein, a reference to a stereo camera may correspond to both examples of the stereo camera device and separate camera devices, which may be included in the stereo matching apparatus 100, one or more respectively cameras physically connected to the stereo matching apparatus 100 through a communication interface, or remote from the stereo matching apparatus 100 and wirelessly or through other communication channels or protocols providing of the left image 111 and the right image 113 to the stereo matching apparatus 100. In a current frame, for example, both camera 101 and camera 103 may respectively capture a current left image 111 and right image 113. Likewise, in a previous frame, for example, both camera 101 and camera 103 may have respectively captured a previous left image 111 and right image 113. The stereo matching apparatus 100 compares the left image 111 and the right image 113 captured from the same object at the respective different viewpoints of the camera 101 and the camera 103. The stereo matching apparatus 100 matches the corresponding two images and acquires a difference between the two images based on a matching result. This difference may be represented as a change or variance in position of the same objects between the left image 111 and the right image 113, e.g., referred to as a disparity discussed further below. Also, herein, a reference to a disparity map of a previous frame may refer to a disparity mapping of such disparities based at least on the aforementioned examples of the previous left image 111 and previous right image 113 of the previous frame, while a reference to a disparity map of a current frame may refer to a disparity mapping of disparities at least based on the aforementioned examples of the current left image 111 and current right image 113 of the current frame. Thus, the stereo matching apparatus 100 acquires distance information based on the acquired difference, or disparity, between the left image 111 and the right image 113. Here, the distance information may indicate a relative physical distance from either of the cameras, or a virtual camera located between the examples two cameras, to a target 125 illustrated in a captured image.

To determine the difference information, the stereo matching apparatus 100 may acquire a difference between a position of a single point 121 of the left image 111 and a position of a point 123 of the right image 113 corresponding thereto, e.g., for each point in the left image 111 and/or each point in the right image 113. As noted above, a difference of the position of the point 123 of the right image 113 corresponding to the single point 121 of the left image 111 is referred to as a disparity. Since a baseline or distance between the cameras 101 and 103 is fixed, known, or available/determinable, an object relatively close to the camera 101 or 103 would have a determined great disparity difference and an object relatively far away from the camera 101 or 103 would have a determined small disparity difference.

The stereo matching apparatus 100 may generate the aforementioned disparity map that represents, as an image or image information, disparities of corresponding points between the left image 111 and the right image 113, e.g., for a particular frame. Thus, the stereo matching apparatus 100 may generate a disparity map corresponding to each frame, calculate respective distance information from each disparity map, and thereby generate a 3D image of each frame. In one non-limiting example, a generated disparity map may be generated using respective colors or intensity pixel values to identify different disparities in the disparity map, so a point relatively close to the camera 101 or 103 may be represented using a bright color or high intensity value and a point relatively far from the camera 101 or 103 may be represented using a dark color or low intensity value in the disparity map.

The stereo matching apparatus 100 performs stereo matching by finding or searching for a corresponding point between the left image 111 and the right image 113 before generating the corresponding disparity in the disparity map. The stereo matching may be a process of finding or searching for a corresponding point of each pixel in the left image 111 from the right image 113 and predicting the corresponding disparity. The stereo matching may also be referred to as a stereo correspondence. The stereo matching may include a cost calculation process, a cost aggregation process, a disparity map generation process, and a post-processing process, for example.

The cost calculation process is a process of calculating a similarity of a candidate area of the right image 113 to find or search for a corresponding point 123 of the right image 113 corresponding to a single point 121 of the left image 111. Here, cost is a concept opposite to the similarity, e.g., in that a great or high cost may indicate that the similarity is small or low and a small or low cost may indicate that the similarity is great or high, with similar opposing gradations therebetween. The stereo matching apparatus 100 may determine a pixel having the optimal cost in the candidate area of the right image 113 as a corresponding point. As an example of the optimal cost, the stereo matching apparatus 100 may determine a point having the lowest cost as the corresponding point.

When calculating a disparity, the stereo matching apparatus 100 may perform spatial stereo matching based on pixels present at different positions in the same time or frame. For example, to calculate the disparity, the stereo matching apparatus 100 may implement a local technique and a global technique. The local technique includes a process of finding a pixel that is determined to most match a pixel of the left image 111 among points on an epipolar line of the right image 113. The global technique includes a process of performing matching by defining an energy model using a constraint condition, such as a smoothness and by minimizing an energy function of the entire image.

The stereo matching apparatus 100 may reduce a calculation complexity by limiting a candidate area of the right image 113 corresponding to a single point of the left image 111 by implementing the local technique. Through this, the stereo matching apparatus 100 may calculate a cost for a pixel included in a limited area of the right image 113, instead of calculating a cost for each pixel included in the entire right image 113. For example, the stereo matching apparatus 100 may limit the candidate area to be pixels on the epipolar line of the right image 113.

When calculating a disparity, the stereo matching apparatus 100 may perform spatial-temporal stereo matching based on different pixels of different times or frames. If a change of a target and a camera motion, e.g., of the stereo camera, are determined insignificant between a previous frame and a current frame, the stereo matching apparatus 100 may further generate a disparity map of the current frame based on information of the previous frame, which may result in a final disparity map that is more accurate than if a disparity map is generated solely on information from the current frame.

Conversely, if the change of the target or the camera motion is determined significant between the previous frame and the current frame, the stereo matching apparatus 100 may determine that reliance on or consideration of the previous frame is inappropriate. For example, the stereo matching apparatus 100 may calculate a confidence of information regarding the previous frame, and may reduce an effect or consideration of the previous frame over a disparity map of the current frame based on the calculated confidence, or may not rely or consider the previous frame at all, such as if the calculated confidence fails to meet a minimum threshold. As described above and further below, if camera motion information is determined to be erroneously estimated or significant, if the disparity map of the previous frame is determined to be inaccurate, and/or if a dynamic object is determined to be present, the stereo matching apparatus 100 may variously filter out inaccurate information and may perform stereo matching more accurately than previous technological approaches.

Figure 2:
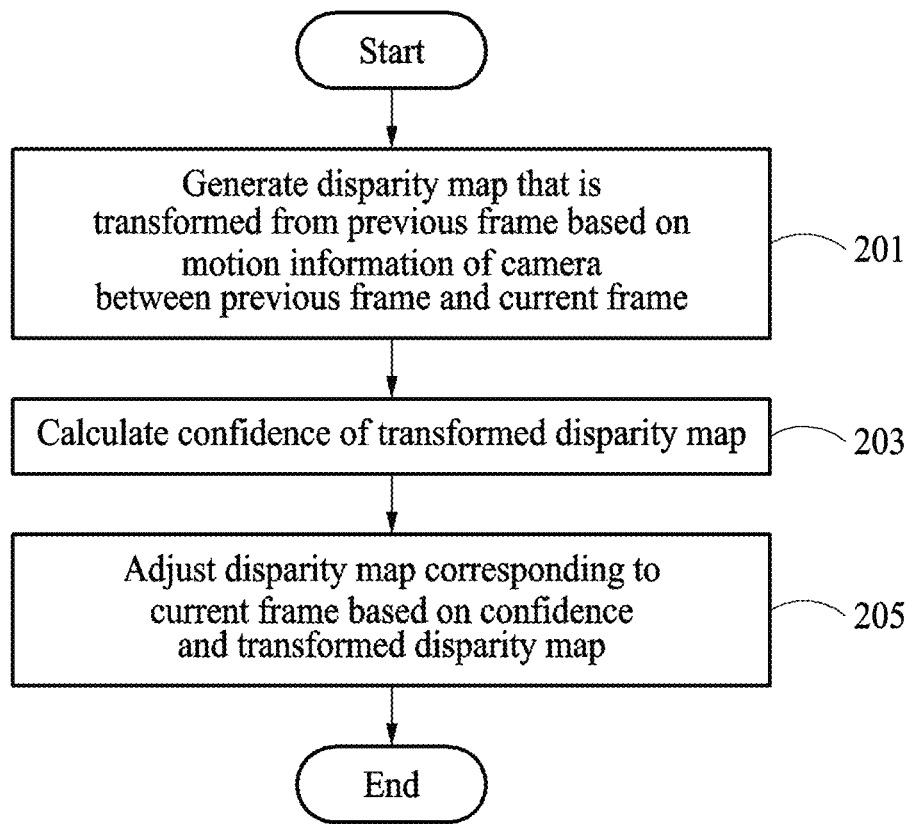
FIG. 2 is a flowchart illustrating an example of a stereo matching method.

FIG. 2 is a flowchart illustrating an example of a stereo matching method. Here, though the below examples of FIG. 2 will be discussed by reference to the stereo matching apparatus 100 of FIG. 1, such references are made for explanatory purposes. Thus, examples of the stereo matching apparatus are not limited thereto.

Referring to FIG. 2, in operation 201, the example stereo matching apparatus 100 may generate a disparity map from a transformation of a disparity map for a previous frame based on determined or measured motion information of a camera between the previous frame and a current frame. For example, the stereo matching apparatus 100 may measure motion information of the camera based on a previous frame and the current frame. The stereo matching apparatus 100 may then transform a disparity map of the corresponding previous frame based on the measured motion information of the camera. Then the stereo matching apparatus 100 may generates a disparity map for the current frame based on the transformed disparity map of the corresponding previous frame.

In operation 203, the stereo matching apparatus 100 may thus calculate a confidence of the disparity map generated through the transformation process. Additionally, or alternatively, in operation 203 the stereo matching apparatus 100 may calculate a confidence of the motion information, calculate a confidence based on a determination of whether a determined dynamic object is changed between the previous frame and the current frame, and/or calculate a confidence of the disparity map of the previous frame.

The confidence of the motion information of the camera may also be referred to as an ego-motion confidence. The stereo matching apparatus 100 may increase the accuracy of the disparity map of/for the current frame using the motion information of the camera when the confidence of the motion information of the camera is high.

The process of determining whether the dynamic object is changed between the previous frame and the current frame may also be referred to as a dynamic object detection. The stereo matching apparatus 100 may increase the accuracy of the disparity map of the current frame, e.g., compared to being based solely on information of the current frame, by generating the disparity map of the current frame using the disparity map of the previous frame when the confidence according to the change in the dynamic object is determined to be high.

When the stereo matching apparatus 100 calculates the confidence of the disparity map corresponding to the previous frame, the stereo matching apparatus 100 may perform a left-right consistency check, such as discussed further below with respect to Equation 5, as only an example. Similar to above, the stereo matching apparatus 100 may accordingly increase the accuracy of the disparity map of the current frame, e.g., compared to being based solely on information of the current frame, by generating the disparity map of the current frame using the disparity map of the previous frame when the confidence of the disparity map of the previous frame is determined to be high.

In operation 205, the stereo matching apparatus 100 may adjust a disparity map generated corresponding to the current frame based on the determined confidence(s) and the transformed disparity map of the previous frame. In an example, the stereo matching apparatus 100 may filter out pixels having corresponding confidences that do not meet, e.g., are less than, a preset reference threshold and, thus, may further accurately generate the disparity map of the current frame.

Figure 3:
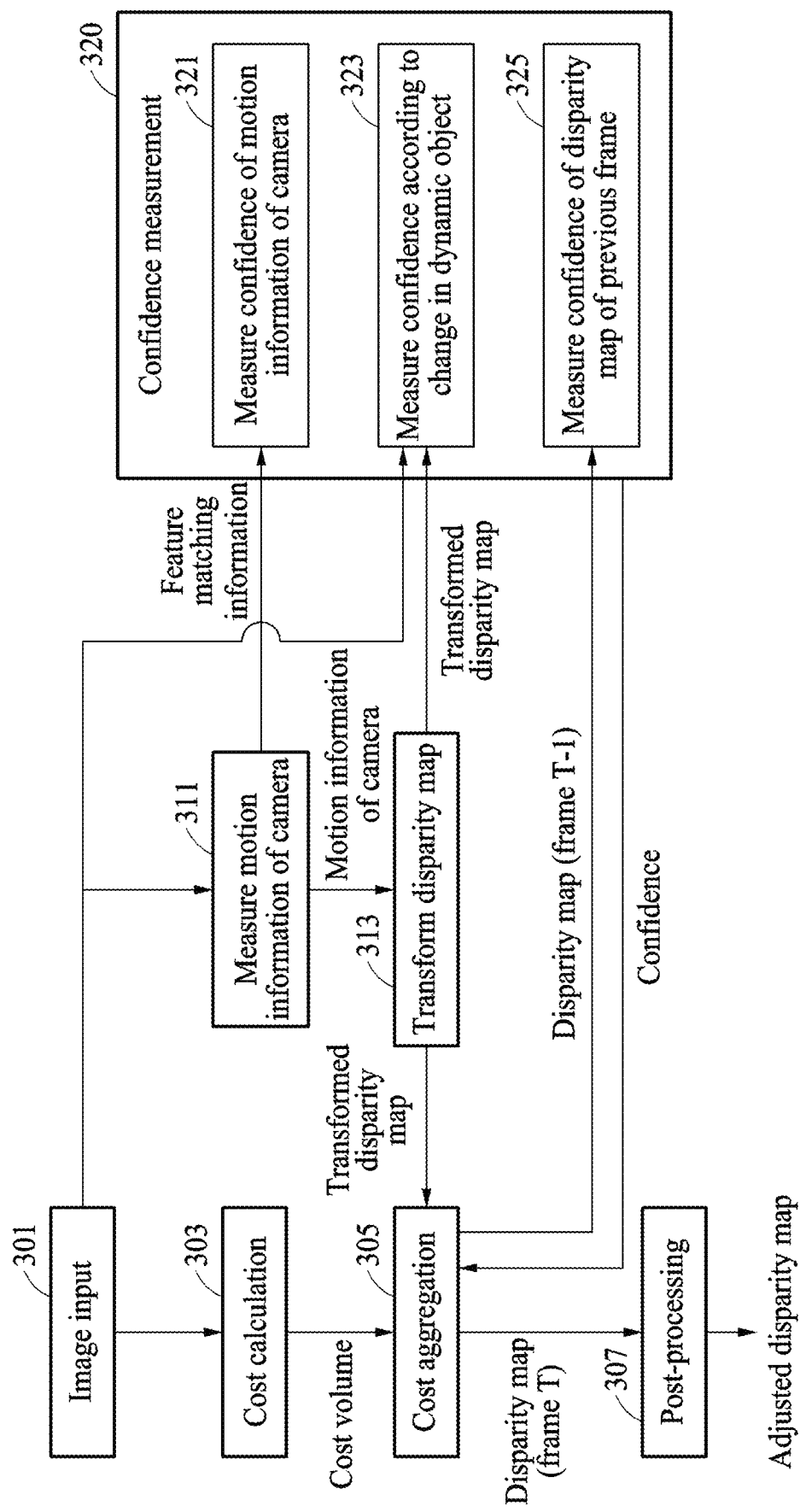
FIG. 3 illustrates an example of a stereo matching method.

FIG. 3 illustrates an example of a stereo matching method. Here, though the below examples of FIG. 3 will be discussed by reference to the stereo matching apparatus 100 of FIG. 1, such references are made for explanatory purposes. Thus, examples of the stereo matching apparatus are not limited thereto.

Referring to FIG. 3, in operation 301, the example stereo matching apparatus 100 receives an image. For example, the stereo matching apparatus 100 may receive respective left and right images of consecutive frames generated by a stereo camera. A left image and a right image of each frame may be used for cost calculation and may be independently used to measure motion information of a camera. A camera parameter used for the cost calculation or to measure the motion information of the camera may be input or predetermined in advance as priori information.

In operation 303, the stereo matching apparatus 100 calculates cost of a frame T that is a current frame. To efficiently perform cost calculation, the stereo matching apparatus 100 may perform pre-processing of the input image. For example, the stereo matching apparatus 100 may perform census transformation on the input image and may acquire a characteristic robust against a color difference between the left image for the current frame and the right image for the current frame.

The stereo matching apparatus 100 may calculate cost of the current frame using a variety of schemes or any combination of such schemes. For example, the stereo matching apparatus 100 may calculate cost for all the disparities with respect to each pixel of the input image using a Hamming distance scheme. If an epipolar line of the right image of the current frame is set as a z axis with respect to each pixel corresponding to an x coordinate W and a y coordinate H of the left image of the current frame, the stereo matching apparatus 100 may generate a 3D cost volume that is represented as the x coordinate W, the y coordinate H, and the z coordinate D. In such an example, the input image may be the left image of the current frame and the epipolar line of the right image provided or obtained in operation 303, though alternatively the input image may be the right image and the epipolar line of the left image provided or obtained. The stereo matching apparatus 100 may calculate the cost volume by calculating the cost with respect to coordinates (x, y, z) of each pixel.

In operation 311, the stereo matching apparatus 100 measures motion information of the camera between the frames T and T−1, that is, the current frame and the previous frame. The stereo matching apparatus 100 extracts at least one feature point by comparing pixels between the previous frame and the current frame. The stereo matching apparatus 100 matches the previous frame and the current frame based on the at least one feature point.

The stereo matching apparatus 100 may measure a change from a position and a direction of the camera used to capture the previous frame to a position and a direction of the camera used to capture the current frame based on a result of the matching of the previous frame and the current frame, e.g., based on the at least one feature point. The stereo matching apparatus 100 may measure information associated with a translation motion and a rotary motion of the camera between the previous frame and the current frame. The stereo matching apparatus 100 may measure motion information of the camera based on a camera parameter that is input in advance or predetermined as priori information. Measuring motion information of the camera may be represented as estimating motion information of the camera.

In operation 313, the stereo matching apparatus 100 transforms a disparity map of the frame T−1, which is the previous frame from the current frame, based on the measured motion information of the camera. The stereo matching apparatus 100 transforms the disparity map of the previous frame to the disparity map of the current frame by applying motion information of the camera to the disparity map of the previous frame. The disparity map of the previous frame may be generated in advance and stored in a memory, e.g., in a previous same operations of FIG. 3 when the disparity map of the previous frame was generated, and loaded from the memory during or before operation 313. The stereo matching apparatus 100 may generate the disparity map of the current frame using the disparity map of the previous frame.

In operation 320, the stereo matching apparatus 100 measures a confidence of information of the previous frame. The stereo matching apparatus 100 measures a confidence of information of the previous frame and determines whether the information of the previous frame is available to generate the disparity map of the current frame, such as through the stereo matching apparatus 100 measuring the confidence of motion information of the camera, measuring a confidence according to a change in a dynamic object, and/or measuring a confidence of the disparity map of the previous frame. For example, the stereo matching apparatus 100 may perform a left-right consistency check to measure the confidence of the disparity map of the previous frame.

For example, the stereo matching apparatus 100 may then derive a single or combined confidence based on the determined confidence of motion information of the camera, the determined confidence according to the change in the dynamic object, and the determined confidence of the disparity map of the previous frame. For example, the stereo matching apparatus 100 may derive a final confidence according to the below Equation 1, for example.

$$\text{Conf}(x,y) = \text{Conf}_o \cdot LRC(x,y) \cdot D(x,y) \qquad \text{Equation 1:}$$

In Equation 1, Conf denotes a final confidence of a pixel positioned at coordinates (x, y) of the disparity map, $Conf_o$ denotes the confidence of motion information of the camera, LRC denotes the confidence of the disparity map of the previous frame that is acquired through the left-right consistency check, and D denotes the confidence according to the change in the dynamic object that is acquired through the dynamic object detection.

More particularly, in operation 321, the stereo matching apparatus 100 may measure the confidence of motion information of the camera. The stereo matching apparatus 100 measures motion information of the camera between the previous frame and the current frame. When measuring motion information of the camera, the stereo matching apparatus 100 extracts feature points of the previous frame and the current frame and measures motion information of the camera through matching between the feature points. When motion information of the camera is measured based on many feature points, the stereo matching apparatus 100 may acquire a further accurate measurement result compared to when only a single or no feature point is extracted. The stereo matching apparatus 100 may measure the confidence of motion information of the camera based on the number of feature points used to measure motion information of the camera.

In operation 323, the stereo matching apparatus 100 may measure the confidence according to the determined change in a determined dynamic object. The stereo matching apparatus 100 may detect between, for example, a case in which a dynamic object is present in the previous frame and absent in the current frame, a case in which a dynamic object is absent in the previous frame and present in the current frame, and a case in which a dynamic object moves between the previous frame and the dynamic frame. If a change occurs in the dynamic object and, in this instance, the previous frame were used to generate the disparity map of the current frame, the resulting disparity map may have a decreased accuracy compared to if the disparity map was not generated based on the disparity map of the previous frame. Accordingly, if a substantial change is determined to occur in the dynamic object, the stereo matching apparatus 100 may determine that the confidence is low.

In operation 325, the stereo matching apparatus 100 may measure the confidence of the disparity map of the previous frame. The stereo matching apparatus 100 may measure the confidence of the disparity map of the previous frame through the left-right consistency check, for example. The stereo matching apparatus 100 may perform the left-right consistency check for each pixel of the previous frame, for example. If respective differences in disparity mappings with respect to the left image of the previous frame and with respect to the right image of the previous frame are less than or equal to a set threshold, for example, the stereo matching apparatus 100 may determine that the confidence is high.

In operation 305, the stereo matching apparatus 100 performs a cost aggregation based on the confidence determined in operation 320 and the transformed disparity map. The stereo matching apparatus 100 adjusts the cost volume corresponding to the current frame based on the confidence. The stereo matching apparatus 100 may adjust the disparity map corresponding to the current frame by performing the cost aggregation based on the cost volume that is adjusted with respect to the current frame.

The stereo matching apparatus 100 adjusts the cost volume corresponding to the current frame based on the measured confidence, the transformed disparity map, and the disparity map corresponding to the current frame. The stereo matching apparatus 100 may adjust the disparity map corresponding to the current frame by aggregating cost corresponding to each pixel of the current frame based on a block unit, using the adjusted cost volume.

The stereo matching apparatus 100 may generate a final disparity map of the current frame based on the cost volume of the current frame, the transformed disparity map, and the measured confidence. For example, the stereo matching apparatus 100 may adjust the cost volume of the current frame according to the below Equation 2, for example.

$$C(x,y,d) = C_{census}(x,y,d) + b \cdot \text{Conf}(x,y) \cdot \min(|d^T(x,y) - d|, \tau)$$
Equation 2:

In Equation 2, $C_{census}$(x, y, d) denotes matching cost of a disparity d of coordinates (x, y), b denotes a control parameter, Conf(x, y) denotes a confidence measured at coordinates (x, y), and $d^T$ denotes the transformed disparity map. The stereo matching apparatus 100 may filter out a case in which a difference between a transformed disparity of coordinates (x, y) by $\min(|d^T(x, y) - d|, \tau)$ and a disparity is greater than or equal to a threshold $\tau$ and may exclude a case in which a transformed disparity and a current disparity differ. The stereo matching apparatus 100 may adjust the cost volume according to Equation 2 and may perform the cost aggregation in association with the adjusted cost volume.

The stereo matching apparatus 100 may perform the cost aggregation using the adjusted cost volume. For example, the stereo matching apparatus 100 may perform the cost aggregation using a multi-block matching scheme. The stereo matching apparatus 100 may perform the cost aggregation according to the below Equation 3, for example.

$$d_A(x, y) = \operatorname*{argmin}_{d} \sum_{b \in B} C(x, y, d)$$
Equation 3

In Equation 3, C(x, y, d) denotes the adjusted cost volume, $d_A$ denotes the disparity that is estimated by performing the cost aggregation, and B denotes a set of blocks. The stereo matching apparatus 100 may determine $d_A$ by comparing costs aggregated based on a block included in a set of blocks corresponding to a pixel with respect to each pixel and by selecting a disparity having the lowest cost.

In operation 307, the stereo matching apparatus 100 acquires the adjusted disparity map by post-processing the resulting disparity map of the current frame from operation 305. For example, the stereo matching apparatus 100 may enhance the accuracy of the disparity map from operation 305 by performing post-processing on the final disparity map of the current frame generated in operation 305.

In one example, distance information for varying objects may be acquired from the disparity map adjusted by the stereo matching apparatus 100. An available driving space may be detected using the adjusted disparity map and an obstacle may be detected from among the varying objects based on the adjusted disparity map and a driving space detection result. The adjusted disparity map may have the enhanced accuracy through confidence measurement compared to previous stereo matching technological approaches. Accordingly, the accuracy of obstacle detection may be enhanced over previous stereo matching approaches.

Figure 4:
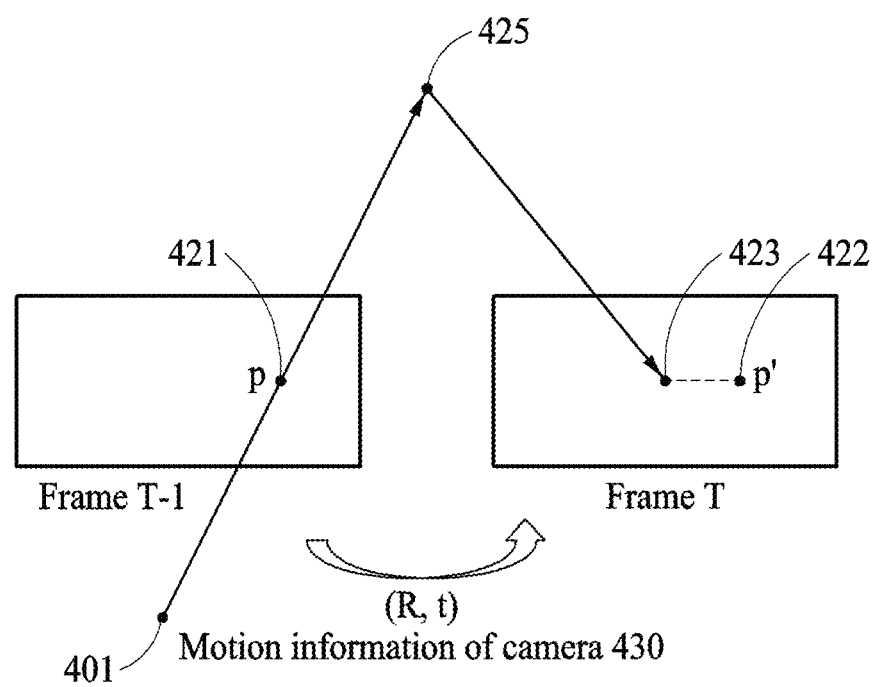
FIG. 4 illustrates an example of an operation of estimating motion information of a camera.

FIG. 4 illustrates an example of an operation of estimating motion information of a camera. Here, though the below examples of FIG. 4 will be discussed by reference to the stereo matching apparatus 100 of FIG. 1, such references are made for explanatory purposes. Thus, examples of the stereo matching apparatus are not limited thereto.

The example stereo matching apparatus 100 extracts feature points from a frame T−1 that is a previous frame and a frame T that is a current frame. The stereo matching apparatus 100 acquires a corresponding point 423 by matching feature points between the previous frame and the current frame. The stereo matching apparatus 100 acquires motion information 430 of the camera using a corresponding point and 2D spatial coordinates.

For example, the stereo matching apparatus 100 may acquire the motion information 430 of the camera by transforming a corresponding point and 2D spatial coordinates to 3D spatial coordinates using a perspective three point (P3P) algorithm. Here, the motion information 430 of the camera includes rotary motion information R or translation motion information T of the camera. The stereo matching apparatus 100 determines a pixel p' 422 of the current frame corresponding to a single pixel p 421 of the previous frame.

The stereo matching apparatus 100 acquires the motion information 430 of the camera by comparing the pixel p' 422 and the corresponding point 423. The stereo matching apparatus 100 may determine a position of the camera of the current frame using a vector that passes the pixel 421 and a position 425 of a target from a position 401 of the camera of the previous frame and a vector that passes the corresponding point 423 from the position 425 of the target. The stereo matching apparatus 100 may acquire the motion information 430 of the camera using a vector that passes the position 425 of the target and the pixel p' 422 and a vector that passes the position 425 of the target and the corresponding point 423.

Figure 5A:
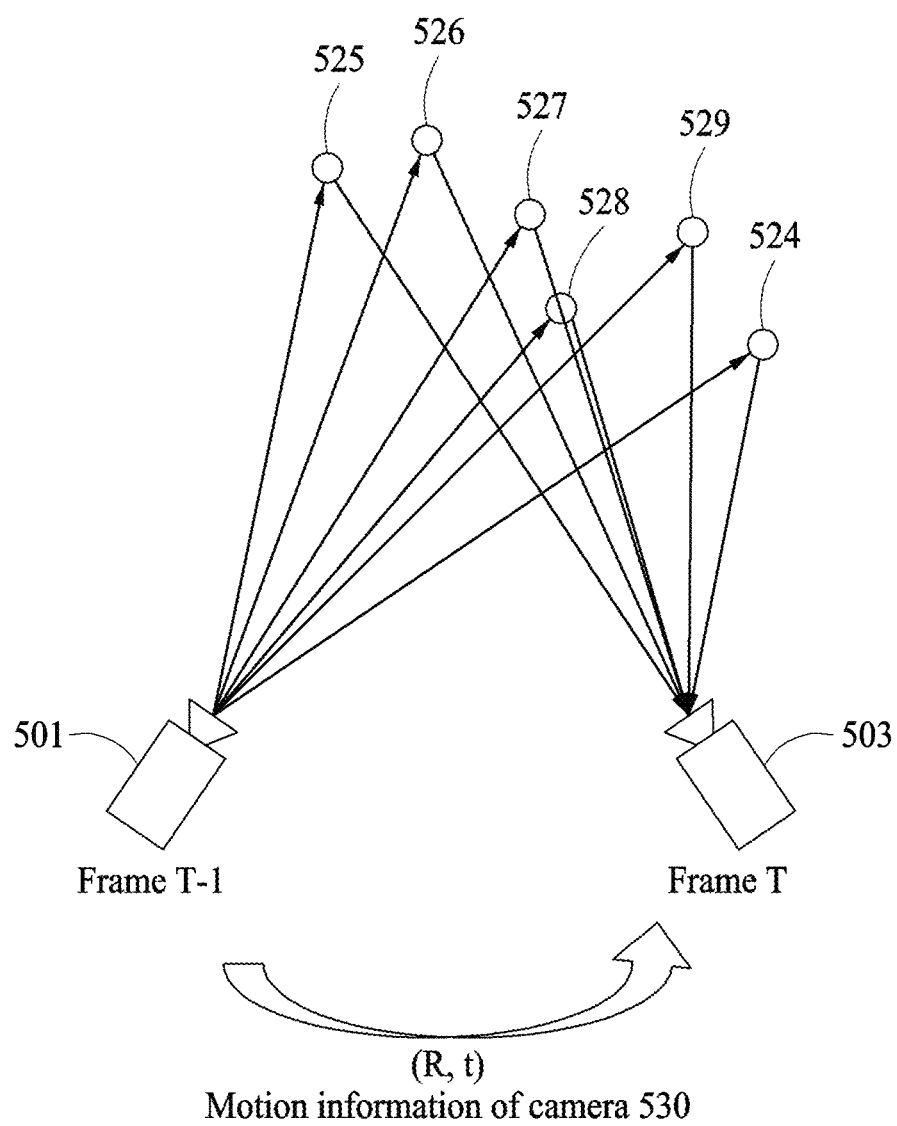
FIG. 5A illustrates an example of an operation of transforming a disparity map from a previous frame to a current frame based on motion information of a camera.
Figure 5B:
FIG. 5B illustrates an example of a disparity map of a previous frame and a disparity map transformed from the previous frame.
Figure 5B:

FIG. 5A illustrates an example of an operation of transforming a disparity map from a previous frame to a current frame based on motion information of a stereo camera, and FIG. 5B illustrates an example of a disparity map of a previous frame and a disparity map transformed from the previous frame. Here, though the below examples of FIGS. 5A and 5B will be discussed by reference to the stereo matching apparatus 100 of FIG. 1, such references are made for explanatory purposes. Thus, examples of the stereo matching apparatus are not limited thereto.

The stereo matching apparatus 100 transforms a disparity map of a frame T−1, which is the previous frame from a current frame T, based on measured motion information 530 of the camera, such as measured above in operations of FIG. 4. The transformed disparity map corresponds to a timing at which the frame T is captured.

For example, the stereo matching apparatus 100 may transform camera position 501 of the camera in the previous frame to a camera position 503 of the current frame based on the motion information 530 of the camera. The stereo matching apparatus 100 may acquire distance information of each pixel of the previous frame based on a disparity map of the previous frame. For example, the stereo matching apparatus 100 acquires example position information 524, 525, 526, 527, 528, and 529 of the respective example targets based on the distance information.

The stereo matching apparatus 100 acquires a disparity map of the current frame based on the position information 524, 525, 526, 527, 528, and 529 and the transformed camera position 503. The stereo matching apparatus 100 may then acquire a left image and a right image for the transformed camera position 503 and acquire a disparity map between the acquired left and right images based on the position information 524, 525, 526, 527, 528, and 529. Thus, the stereo matching apparatus 100 may directly transform the disparity map of the previous frame to a disparity map corresponding to a timing at which the current frame is captured based on the motion information 530 of the camera.

Referring to FIG. 5B, the illustrated disparity map of a frame T−1 is a previous frame is a disparity map that is acquired from a left image and a right image captured at a stereo camera position of the previous frame, while the illustrated disparity map transformed from the frame T−1 to frame T, as a current frame, is acquired by transforming the disparity map of the frame T−1 to a disparity map of a timing corresponding to the frame T based on motion information of the stereo camera.

Figure 6:
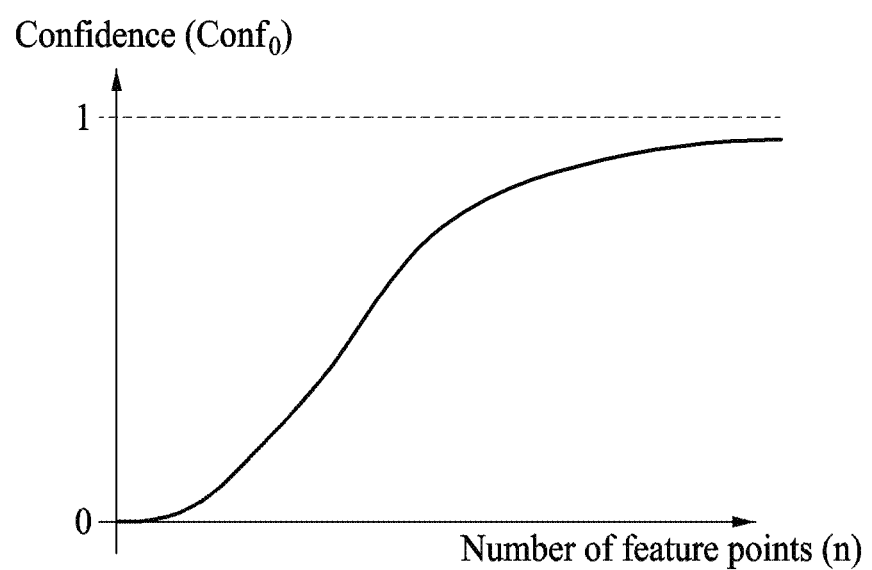
FIG. 6 is a graph showing an example of an operation of calculating a confidence of motion information of a camera.

FIG. 6 is a graph showing an example of an operation of calculating a confidence of motion information of a camera. Here, though the below examples of FIG. 6 will be discussed by reference to the stereo matching apparatus 100 of FIG. 1, such references are made for explanatory purposes. Thus, examples of the stereo matching apparatus are not limited thereto.

The stereo matching apparatus 100 calculates the confidence of motion information of the camera. The stereo matching apparatus 100 may calculate the confidence of motion information of the camera based on a number of extracted feature points used to estimate motion information of the camera. According to an increase in the number of feature points used to estimate motion information of the camera, a calculation amount increases and the accuracy of the confidence calculation increases. Accordingly, the stereo matching apparatus 100 may determine that the confidence of motion information of the camera is high with an increase in the number of feature points being used. The stereo matching apparatus 100 may measure the confidence of motion information of the camera according to the below Equation 4, for example.

$$\text{Conf}_o = e^{-a/n} \qquad \text{Equation 4:}$$

In Equation 4, a denotes a control parameter, n denotes the number of feature points, and $\text{Conf}_o$ denotes the confidence of motion information of the camera. According to Equation 4, as the number of feature points decreases, the confidence converges to 0. As the number of feature points increases, the confidence converges to 1.

Figure 7A:
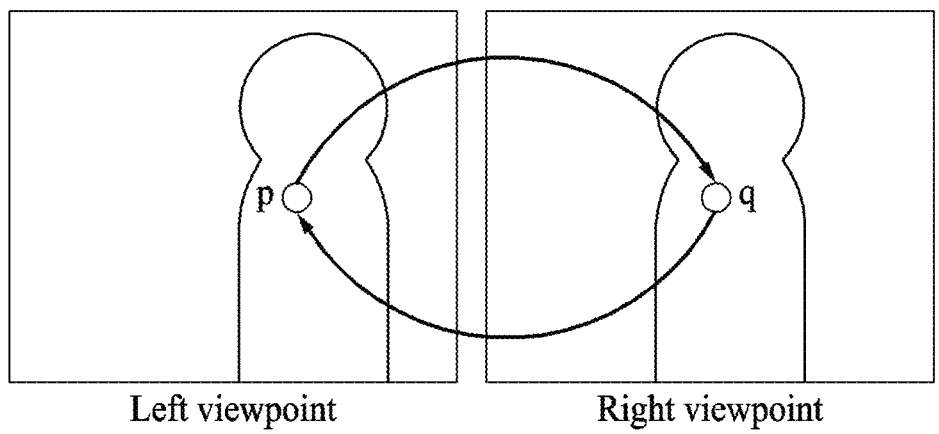
FIG. 7A illustrates an example in which a disparity map corresponding to a previous frame has a high confidence.
Figure 7B:
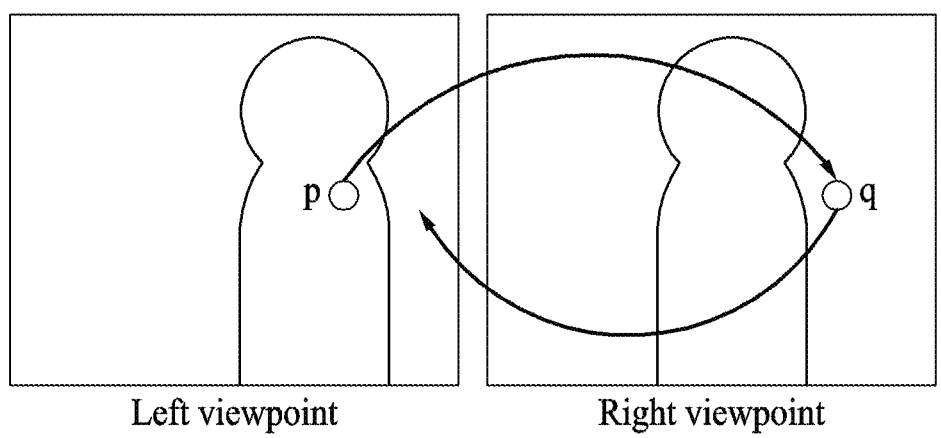
FIG. 7B illustrates an example in which a disparity map corresponding to a previous frame has a low confidence.

FIG. 7A illustrates an example in which a disparity map corresponding to a previous frame has a high confidence, and FIG. 7B illustrates an example in which a disparity map corresponding to a previous frame has a low confidence. Here, though the below examples of FIGS. 7A and 7B will be discussed by reference to the stereo matching apparatus 100 of FIG. 1, such references are made for explanatory purposes. Thus, examples of the stereo matching apparatus are not limited thereto.

The stereo matching apparatus 100 calculates a confidence of the disparity map corresponding to the previous frame. The stereo matching apparatus 100 calculates the confidence by comparing a left disparity map and a right disparity map of the previous frame. The left disparity map may be a disparity map generated from the perspective of the left image, while the right disparity map may be a disparity map generated from the perspective of the right image. For example, the stereo matching apparatus 100 may measure the confidence of the disparity map of the previous frame by performing a left-right consistency check. The stereo matching apparatus 100 may measure the confidence of the disparity map of the previous frame according to the below Equation 5, for example.

$$LRC(x, y) = \begin{cases} 1, & \text{if } |d_L(x, y) - d_R(x - d_L(x, y), y)| < T \\ 0, & \text{otherwise} \end{cases} \quad \text{Equation 5}$$

Referring to Equation 5, the stereo matching apparatus 100 performs transformation to a right viewpoint by applying a disparity estimated with respect to a single pixel, for each pixel of a disparity map $d_L$ of a left image. The stereo matching apparatus 100 may compare a disparity $d_L(x,y)$ corresponding to a pixel (x, y) of the disparity map $d_L$ of the left image and a disparity $d_R(x-d_L(x, y), y)$ corresponding to a pixel $(x-d_L(x, y), y)$ of a disparity map $d_R$ of a right image and may determine whether they are the same or how close they are to being the same.

The more accurate the estimated disparity, the probability that corresponding disparities of the left image and the right image are the same may also increase. Accordingly, if the comparison result fails to meet, e.g., is less than, a threshold T, the stereo matching apparatus 100 determines that the confidence is high. If the comparison result meets, e.g., is greater than, the threshold T, the stereo matching apparatus 100 determines that the confidence is low.

Referring to FIG. 7A, a disparity corresponding to a position that is transformed to a right viewpoint from a pixel p of a left viewpoint is the same as a disparity of a pixel q of the right view point. Thus, the stereo matching apparatus 100 may determine that a confidence of a disparity map for the pixels p and q of the previous frame is high.

Referring to FIG. 7B, a disparity corresponding to a position that is transformed to a right view point from a pixel p of a left viewpoint differs from a disparity of a pixel q of a right viewpoint. Thus, the stereo matching apparatus 100 may determine that a confidence of a disparity map for pixels p and q of the previous frame is low.

Figure 8A:
FIG. 8A illustrates an example of a reference image of a current frame.
Figure 8B:
FIG. 8B illustrates an example of a reference image transformed from a previous frame.
Figure 8C:
FIG. 8C illustrates an example of a static region mask based on whether a dynamic object is changed.

FIG. 8A illustrates an example of a reference image of a current frame, FIG. 8B illustrates an example of a reference image transformed from a previous frame, and FIG. 8C illustrates an example of a static region mask based on whether a dynamic object is changed. Here, though the below examples of FIGS. 8A through 8C will be discussed by reference to the stereo matching apparatus 100 of FIG. 1, such references are made for explanatory purposes. Thus, examples of the stereo matching apparatus are not limited thereto.

The stereo matching apparatus 100 may calculate a confidence based on whether the dynamic object is changed between the previous frame and the current frame. The stereo matching apparatus 100 may calculate the confidence by moving the previous frame using the transformed disparity map and by comparing a motion result with the current frame.

Referring to FIGS. 8A and 8B, the stereo matching apparatus 100 may move a reference image of a frame T−1 that is the previous frame to a timing at which a frame T that is the current frame is captured, based on the aforementioned transformed disparity map. FIG. 8C illustrates an example of the static region mask that is acquired based on the reference image that is transformed to the current frame and the reference image of the current frame.

The stereo matching apparatus 100 may perform a brightness comparison for each pixel of the reference image of the current frame and the transformed reference image. If only a static object is present in the previous frame and the current frame, the transformed reference image and the reference image of the current frame are similar. Accordingly, the stereo matching apparatus 100 may determine that a confidence of a corresponding pixel is high. For example, the stereo matching apparatus 100 may determine the confidence as 1.

If the dynamic object is present in the previous frame and the current frame, the transformed reference image and the reference image of the current frame are different with respect to a pixel associated with the dynamic object. Accordingly, the stereo matching apparatus 100 may determine that a confidence of the corresponding pixel is low. For example, the stereo matching apparatus 100 may determine the confidence as 0.

Figure 9:
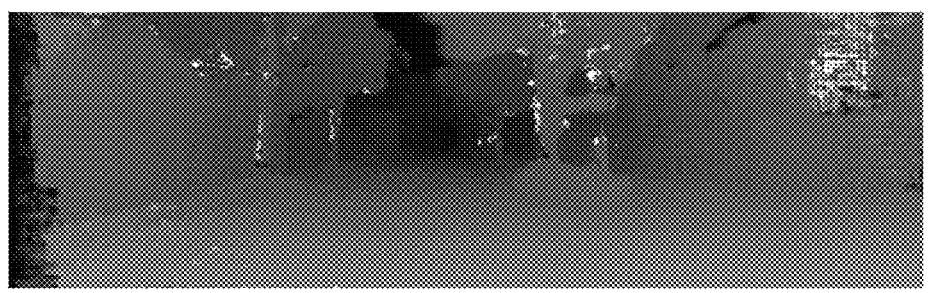
FIG. 9 illustrates an example of a change in a disparity map occurring due to a post-processing process.
Figure 9:
Figure 9:
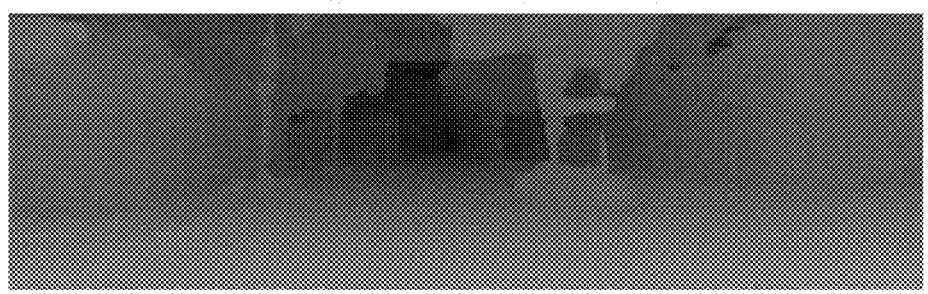

FIG. 9 illustrates an example of a change in a disparity map occurring due to a post-processing process. Here, though the below examples of FIG. 9 will be discussed by reference to the stereo matching apparatus 100 of FIG. 1, such references are made for explanatory purposes. Thus, examples of the stereo matching apparatus are not limited thereto.

The stereo matching apparatus 100 may acquire an adjusted disparity map by post-processing a disparity map of a current frame.

The stereo matching apparatus 100 may remove an abnormal value or perform filtering on a final disparity map of the current frame, such as on the estimated disparity map generated in operation 305 of FIG. 3. The stereo matching apparatus 100 may perform a left-right consistency check on the disparity map of the current frame. A disparity of a pixel that does not pass a preset standard of the left-right consistency check of the post-processing process is removed, which is different from the aforementioned confidence measurement process.

The stereo matching apparatus 100 may remove a disparity of a pixel that is different from that of a neighboring pixel by performing speckle filtering on the final disparity map. The stereo matching apparatus 100 may allocate the disparity of the pixel removed through the left-right consistency check or the speckle filtering to the neighboring pixel using a hole-filling scheme, for example.

The stereo matching apparatus 100 may remove noise of the disparity map using a median filtering scheme. The stereo matching apparatus 100 may enhance the accuracy of the disparity by estimating a value less than a decimal point of an integer unit disparity using a sub-pixel accuracy enhancement scheme.

The stereo matching apparatus 100 may enhance the accuracy of the disparity map by performing post-processing on the final disparity map of the current frame. Referring to FIG. 9, although noise is great in the illustrated initial disparity map, such noise is removed in the illustrated post-processed disparity map.

Figure 10:
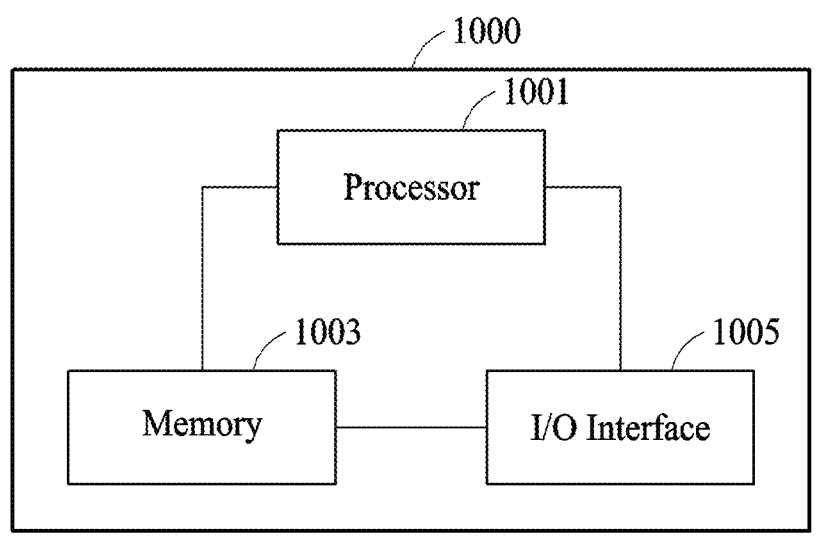
FIG. 10 is a block diagram illustrating an example of a stereo matching apparatus.

FIG. 10 is a block diagram illustrating an example of a stereo matching apparatus.

Referring to FIG. 10, a stereo matching apparatus 1000 includes one or more of one or more processors 1001, one or more memories 1003, and one or more input/output (I/O) interfaces 1005. The stereo matching apparatus 1000 may correspond to stereo matching system or the stereo matching apparatus 100 of FIG. 1, or any or any combination of the stereo matching apparatuses 100 discussed with respect to FIGS. 2 through 9, noting the examples are not limited thereto.

The memory 1003 stores instructions to be executed by the processor 1001. The memory 1003 stores a parameter of a stereo camera or respective parameters of cameras of the stereo camera. The memory 1003 stores consecutive input images that are input through the I/O interface 1005 and/or output images that are processed by the processor 1001.

For example, the I/O interface 1005 respectively receives a left image and a right image for consecutive frames generated by the stereo camera.

The processor 1001 generates a disparity map that is transformed from a previous frame based on motion information of the stereo camera between the previous frame and the current frame. For example, the processor 1001 may calculate cost for each pixel of an input image and may calculate a cost volume using a Hamming distance scheme. The processor 1001 may measure motion information of the stereo camera between the previous frame and the current frame and may transform a disparity map from the previous frame to the current frame based on motion information of the stereo camera.

The processor 1001 calculates a confidence of the transformed disparity map. The processor 1001 calculates a confidence of motion information of the stereo camera. The processor 1001 calculates a confidence of a disparity map corresponding to the previous frame. The processor 1001 calculates the confidence based on whether a dynamic object is changed between the previous frame and the current frame. The processor 1001 may collectively represent, as a single confidence, the confidence of motion information of the stereo camera, the confidence of the disparity map corresponding to the previous frame, and the confidence calculated based on whether the dynamic object is changed.

The processor 1001 adjusts a disparity map corresponding to the current frame using the disparity map that is transformed based on the confidence. The processor 1001 adjusts the cost volume corresponding to the current frame based on the confidence. The processor 1001 adjusts the disparity map corresponding to the current frame by performing a cost aggregation based on the cost volume that is adjusted with respect to the current frame. Thus, the processor 1010 may be representative of one or more processors configured to implement any of the operations or methods described above with respect to FIGS. 1 through 9.

The stereo matching apparatus 100, camera 101, camera 103, stereo cameras, stereo matching apparatus 1000, processor 1001, memory 1003, and I/O interface 1005 in FIGS. 1-10 and other apparatuses, units, modules, devices, and other components described herein and that perform the operations described in this application are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented stereo matching method, the method comprising:
generating an initial disparity map by transforming a previous disparity map of a previous frame based on determined motion information of a camera between the previous frame and a current frame;
calculating a confidence for the initial disparity map; and
adjusting a current disparity map corresponding to the current frame based on the calculated confidence and the initial disparity map,
wherein the adjusting of the current disparity map comprises:
adjusting a cost volume corresponding to the current frame based on the calculated confidence; and
adjusting the current disparity map corresponding to the current frame by performing a cost aggregation with respect to the current frame based on the adjusted cost volume, and
wherein the adjusting of the cost volume comprises adjusting the cost volume corresponding to the current frame based on the calculated confidence, the inital disparity map, and the current disparity map corresponding to the current frame.

2. The method of claim 1, wherein the calculating of the confidence for the initial disparity map comprises calculating a confidence of the determined motion information of the camera.

3. The method of claim 2, wherein the calculating of the confidence for the initial disparity map comprises calculating a confidence of the determined motion information of the camera based on a number of extracted feature points used to estimate the motion information of the camera.

4. The method of claim 1, wherein the calculating of the confidence for the initial disparity map comprises calculating a confidence of the previous disparity map of the previous frame.

5. The method of claim 4, wherein the calculating of the confidence of the previous disparity map of the previous frame comprises calculating the confidence of the previous disparity map of the previous frame by comparing a left disparity map and a right disparity map of the previous frame.

6. The method of claim 1, wherein the calculating of the confidence for the initial disparity map comprises calculating a confidence based on whether a dynamic object is changed between the previous frame and the current frame.

7. The method of claim 6, wherein the confidence based on whether the dynamic object is changed between the previous frame and the current frame is calculated by moving the previous frame using the transformed previous disparity map and comparing a result of the moving with the current frame.

8. The method of claim 1, wherein the adjusting of the current disparity map comprises adjusting the current disparity map corresponding to the current frame by aggregating costs corresponding to each pixel of the current frame based on a block unit, using the adjusted cost volume.

9. The method of claim 1, further comprising determining a distance to an object in an image for the current frame using the adjusted current disparity map corresponding to the current frame.

10. A non-transitory computer-readable storage medium storing instructions that, when executed by one or more processors, cause the one or more processors to perform the method of claim 1.

11. A stereo matching apparatus comprising:
one or more processors configured to
generate an initial disparity map by transforming a previous disparity map of a previous frame based on determined motion information of a camera between the previous frame and a current frame,
calculate a confidence for the initial disparity map, and
adjust a current disparity map corresponding to the current frame based on the calculated confidence and the initial disparity map,
wherein, to adjust the current disparity map, the one or more processors are configured to adjust a cost volume corresponding to the current frame based on the calculated confidence; and adjust the current disparity map corresponding to the current frame by performing a cost aggregation with respect to the current frame based on the adjusted cost volume,
wherein, to adjust the cost volume, the one or more processors are configured to adjust the cost volume corresponding to the current frame based on the calculated confidence, the initial disparity map, and the current disparity map corresponding to the current frame.

12. The stereo matching apparatus of claim 11, further comprising at least one memory configured to store instructions that, when executed by the one or more processors, cause the one or more processors to perform the generating of the initial disparity map by performing the transforming of the previous disparity map of the previous frame, perform the calculating of the confidence for the initial disparity map, and perform the adjusting of the current disparity map corresponding to the current frame.

13. The stereo matching apparatus of claim 11, wherein, to perform the calculating of the confidence for the initial disparity map, the one or more processors are configured to calculate a confidence of the determined motion information of the camera.

14. The stereo matching apparatus of claim 11, wherein, to perform the calculating of the confidence for the initial disparity map, the one or more processors are configured to calculate a confidence of the previous disparity map of the previous frame.

15. The stereo matching apparatus of claim 11, wherein, to perform the calculating of the confidence for the initial disparity map, the one or more processors are configured to calculate a confidence based on whether a dynamic object is changed between the previous frame and the current frame.

16. The stereo matching apparatus of claim 11, wherein the one or more processors are configured to
adjust a cost volume corresponding to the current frame based on the calculated confidence; and
adjust the current disparity map corresponding to the current frame by performing a cost aggregation with respect to the current frame based on the adjusted cost volume.

17. A processor implemented stereo matching method, the method comprising:
generating a cost volume corresponding to a current frame of a stereo camera;
calculating a confidence with respect to disparities corresponding to a previous frame of the stereo camera;
generating a current disparity mapping corresponding to the current frame by performing a cost aggregation with respect to the current frame dependent on the generated cost volume and the calculated confidence; and
determining a distance to an object in an image for the current frame using the current disparity mapping corresponding to the current frame, wherein the calculating of the confidence with respect to the disparities corresponding to the previous frame further comprises calculating the confidence with respect to the disparities corresponding to the previous frame based on consideration of any one or any two or more of respective confidences calculated with respect to a previous disparity mapping corresponding to the previous frame, determined motion information of the stereo camera, and a determination of whether one or more dynamic objects change between the previous frame and the current frame.

18. The method of claim 17, further comprising determining the motion information of the stereo camera,
wherein the calculating of the confidence with respect to the disparities corresponding to the previous frame comprises calculating the confidence with respect to the disparities corresponding to the previous frame based on consideration of either one or both of the determined motion information and a transformation of the previous disparity mapping corresponding to the previous frame based on the determined motion information.

19. The method of claim 18, further comprising performing the transformation of the previous disparity mapping corresponding to the previous frame based on the determined motion information.

20. The method of claim 19, wherein the performing of the cost aggregation with respect to the current frame dependent on the generated cost volume and the calculated confidence includes adjusting the cost volume based on the calculated confidence and the transformed previous disparity mapping and performing a cost aggregation of the adjusted cost volume.

21. The method of claim 17, wherein the performing of the cost aggregation with respect to the current frame dependent on the generated cost volume and the calculated confidence includes adjusting the cost volume based on the calculated confidence and performing a cost aggregation of the adjusted cost volume.

22. A non-transitory computer-readable storage medium storing instructions that, when executed by one or more processors, cause the one or more processors to perform the method of claim 17.

* * * * *